United States Patent
Udo et al.

(10) Patent No.: US 11,394,268 B2
(45) Date of Patent: Jul. 19, 2022

(54) ELECTRIC POWER STEERING DEVICE

(71) Applicant: Mitsubishi Electric Corporation, Tokyo (JP)

(72) Inventors: Toyoaki Udo, Tokyo (JP); Yoshihito Teshima, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 326 days.

(21) Appl. No.: 16/634,232

(22) PCT Filed: Aug. 23, 2017

(86) PCT No.: PCT/JP2017/030097
§ 371 (c)(1),
(2) Date: Jan. 27, 2020

(87) PCT Pub. No.: WO2019/038850
PCT Pub. Date: Feb. 28, 2019

(65) Prior Publication Data
US 2021/0091625 A1      Mar. 25, 2021

(51) Int. Cl.
*H02K 5/10*     (2006.01)
*B62D 5/04*     (2006.01)
(Continued)

(52) U.S. Cl.
CPC ............ *H02K 5/10* (2013.01); *B62D 5/0403* (2013.01); *B62D 5/046* (2013.01); *H01R 13/5202* (2013.01); *H02K 5/225* (2013.01)

(58) Field of Classification Search
CPC .. B62D 5/0403; B62D 5/046; H01R 13/5202; H02K 11/33; H02K 5/10; H02K 5/225
See application file for complete search history.

(56) References Cited

U.S. PATENT DOCUMENTS

2014/0339966 A1*  11/2014  Tomizawa ............ H02K 11/33
                                                    310/68 D
2016/0165736 A1*  6/2016  Tsuboi ................... H02K 11/33
                                                    174/50.54

FOREIGN PATENT DOCUMENTS

JP      2008022659 A  *  1/2008  ............ H01R 39/04
JP      5377710 B2       12/2013
(Continued)

OTHER PUBLICATIONS

International Search Report for PCT/JP2017/030097 dated Oct. 3, 2017 (PCT/ISA/210).

*Primary Examiner* — Naishadh N Desai
(74) *Attorney, Agent, or Firm* — Sughrue Mion, PLLC; Richard C. Turner (57) ABSTRACT

Provided is an electric power steering device, including: a motor; and a control device, wherein the motor includes a case having a cylindrical shape, wherein the control device includes: a housing having a cylindrical shape, wherein the case and the housing are coupled to each other in a state in which an outer peripheral end portion at one end portion of the case and an outer peripheral end portion at one end portion of the housing face each other, wherein a first sealing material is disposed between the case and the housing, wherein a connector is disposed between the case and the housing, wherein a second sealing material is disposed between the housing and the connector, and wherein a part of the first sealing material and a part of the second sealing material adhere to each other.

7 Claims, 4 Drawing Sheets

(51) Int. Cl.
*H01R 13/52* (2006.01)
*H02K 5/22* (2006.01)

(56) References Cited

FOREIGN PATENT DOCUMENTS

| JP | 2016094113 A | * | 5/2016 | | |
|---|---|---|---|---|---|
| JP | 2016109172 A | * | 6/2016 | ............. | H02K 11/33 |
| WO | WO-2017068636 A1 | * | 4/2017 | ............. | B23P 19/02 |

* cited by examiner

ELECTRIC POWER STEERING DEVICE

CROSS REFERENCE TO RELATED APPLICATIONS

This application is a National Stage of International Application No. PCT/JP2017/030097 filed Aug. 23, 2017.

TECHNICAL FIELD

The present invention relates to an electric power steering device in which a motor and a control device are integrated with each other.

BACKGROUND ART

Hitherto, there has been known an electric power steering device, in which a control device is disposed coaxially with an output shaft of a motor, and in which the motor and the control device are integrated with each other. In some cases, the electric power steering device in which the motor and the control device are integrated with each other has the following structure. A connector is provided to a housing of the control device. A stator, a rotor, and other components are built in a case of the motor. The housing of the control device is coupled to the case of the motor (for example, see Patent Literature 1).

CITATION LIST

Patent Literature

[PTL 1] JP 5377710 B2

SUMMARY OF INVENTION

Technical Problem

In the related-art electric power steering device disclosed in Patent Literature 1, there is a risk in that rainwater may be poured on the motor and the control device. Accordingly, it is required to perform waterproof treatment for a portion between the case of the motor and the housing of the control device and a gap between a mounting hole formed in the housing of the control device and the connector disposed in the mounting hole. As the waterproof treatment, it is conceivable to fill a gap between components with a sealing material to close the gap. With regard to the gap between the mounting hole of the housing and the connector, it is also conceivable to adopt a method of integrally molding the connector and the housing to eliminate the gap. However, in consideration of the fact that a type of the connector varies depending on specifications of a vehicle that includes the electric power steering device mounted thereto, there is no choice but to separate the connector and the housing from each other.

However, in order to fill the gap between the mounting hole of the housing and the connector with the sealing material, it has been required to run a sealing device, which is configured to apply the sealing material, around the connector along an outer shape of the connector. Such a sealing process is complicated, and requires a large number of man-hours.

The present invention has been made to solve the problem described above, and obtains an electric power steering device, which is capable of improving easy of manufacture thereof.

Solution to Problem

According to one embodiment of the present invention, there is provided an electric power steering device, including a motor; and a control device, wherein the motor includes a case which is opened at one end portion, wherein the control device includes: a control device main body; a connector connected to the control device main body; and a housing having a cylindrical shape which is opened at one end portion and closed at another end portion, wherein the housing houses the control device main body, wherein the case and the housing are coupled to each other in a state in which an outer peripheral end portion at the one end portion of the case and an outer peripheral end portion at the one end portion of the housing face each other, wherein a first sealing material is disposed between the outer peripheral end portion of the case and the outer peripheral end portion of the housing, wherein the connector is disposed between the outer peripheral end portion of the case and the outer peripheral end portion of the housing, wherein a second sealing material is disposed between the housing and at least one surface facing the housing among a plurality of surfaces which form an outer periphery of the connector, and wherein a part of the first sealing material disposed between the outer peripheral end portion of the case and the outer peripheral end portion of the housing and a part of the second sealing material disposed between the housing and the surface of the connector adhere to each other.

Advantageous Effects of Invention

According to the present invention, the sealed regions between three components, which are the housing, the case, and the connector, can be coupled to one another. In this way, the sealing process can be simplified, and the man-hours for manufacture can be reduced.

DESCRIPTION OF EMBODIMENTS

Now, with reference to the drawings, an electric power steering device according to exemplary embodiments of the present invention is described.

First Embodiment

Figure 1:
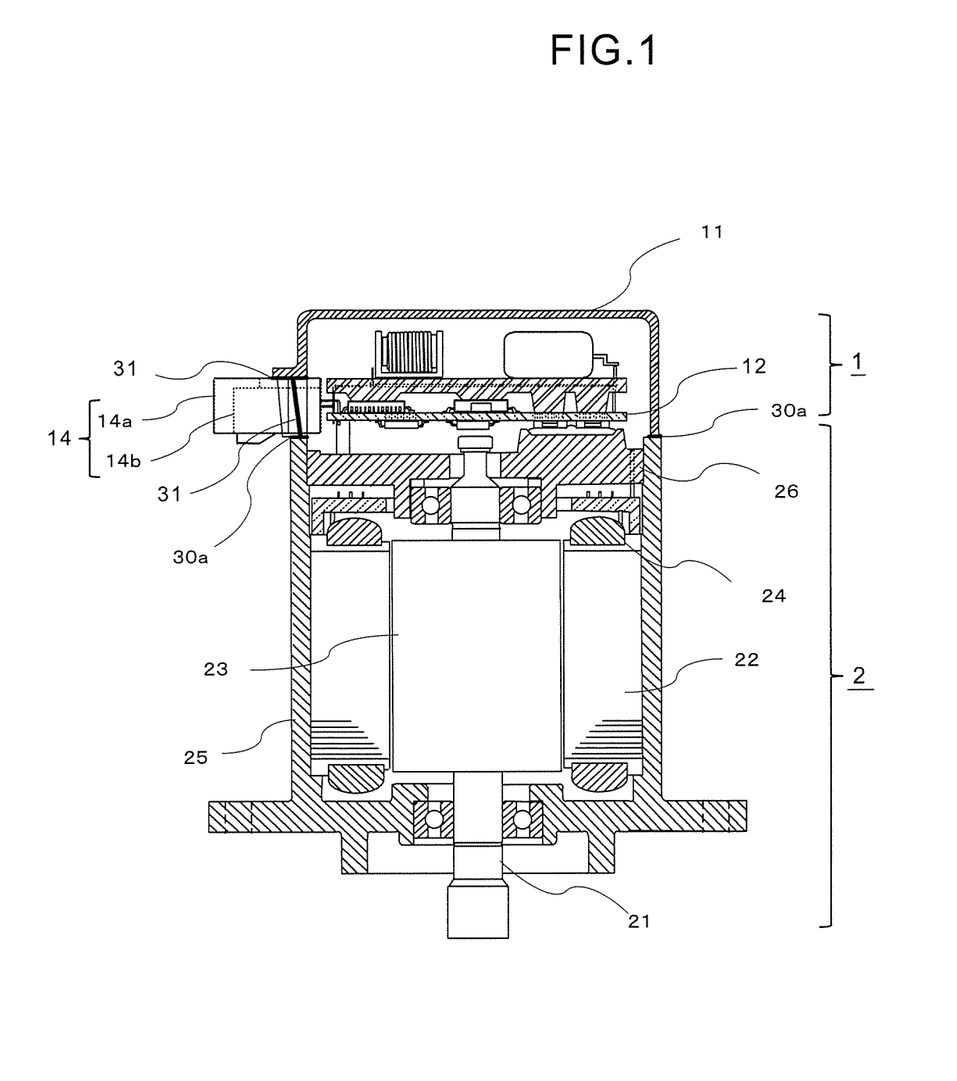
FIG. 1 is a sectional view of an electric power steering device according to a first embodiment.
Figure 2:
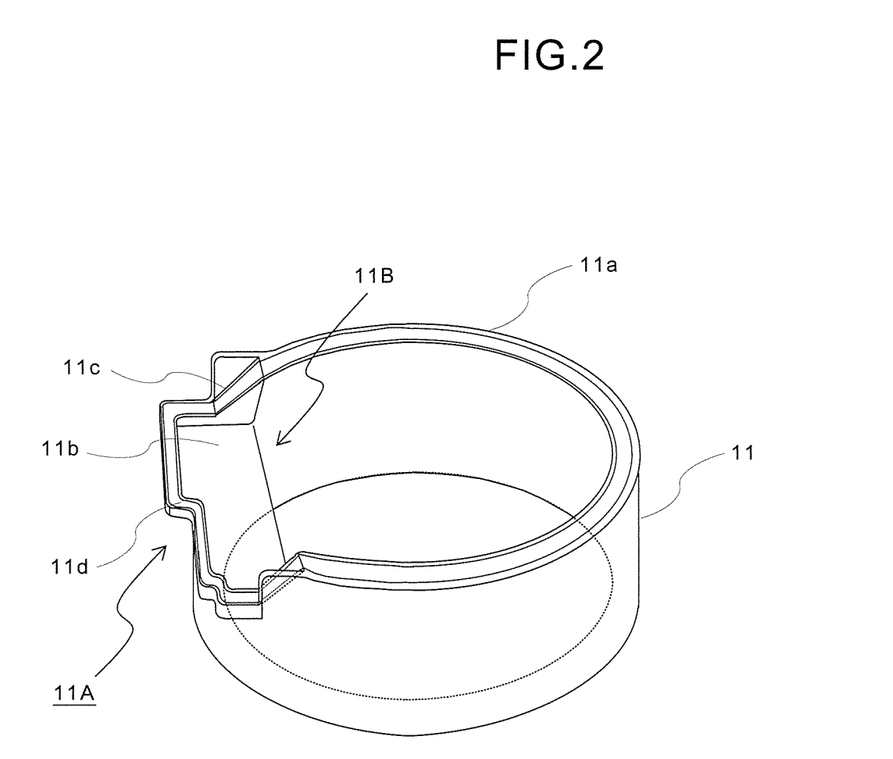
FIG. 2 is a perspective view of a housing in the first embodiment.

FIG. 1 is a configuration view for illustrating an electric power steering device according to a first embodiment of the present invention. Moreover, FIG. 2 is a perspective view for illustrating a housing 11 of FIG. 1.

As illustrated in FIG. 1, the electric power steering device according to the first embodiment includes a control device 1 and a motor 2. The control device 1 and the motor 2 are coupled to each other through intermediation of a first sealing material 30a and a second sealing material 31.

The motor 2 includes an output shaft 21, a stator 22, a rotor 23, a case 25, and a frame 26. The output shaft 21, the stator 22, and the rotor 23 are housed in the case 25. The case 25 has a cylindrical shape which is opened at one end portion, and a through hole is formed in another end portion of the output shaft 21. The opening in the one end portion of the case 25 is closed by the frame 26. One end portion of the output shaft 21 is rotatably supported by the case 25 through intermediation of a bearing, and another end portion of the output shaft 21 is rotatably supported by the frame 26 through intermediation of a bearing. The one end portion of the output shaft 21 protrudes outward from the through hole in another end portion of the case 25.

The rotor 23 is fixed to the output shaft 21. The stator 22 is disposed in a state of surrounding an outer periphery of the rotor 23. A plurality of permanent magnets (not shown) are provided on an outer peripheral portion of the rotor 23. A winding 24 is wound around the stator 22.

The frame 26 is fixed on an inner side of the case 25. Thus, a connection portion between the frame 26 and the case 25 is not exposed to an outer side of the case 25. Therefore, it is not required to seal the connection portion between the frame 26 and the case 25. As described above, the frame 26 is mounted on the inner side of the case 25, and hence regions required to be sealed are reduced.

The control device 1 includes the housing 11, a control device main body 12, and a connector 14. The connector 14 includes connectors 14a and 14b of two different types which are integrated with each other. The connector 14 includes a plurality of terminals. Each of the plurality of terminals of the connector 14 is electrically connected to the control device main body 12. A harness for supplying power to the control device main body 12 and a harness for transmitting and receiving signals are connected to the connector 14 from the outside.

The control device main body 12 is housed inside the housing 11. The connector 14 penetrates the housing 11, and a part thereof is exposed to an outside of the housing 11. The control device main body 12 includes a control board and a relay board. The control board includes a plurality of electronic components. The control device main body 12 is in contact with the frame 26. The frame 26 serves as a heat sink for the plurality of electronic components included in the control device main body 12.

As illustrated in FIG. 2, the housing 11 has a cylindrical shape which is opened at one end portion and closed at another end portion. An outer peripheral end portion 11a is formed at the one end portion of the housing 11. A connector mounting portion 11A is formed at a part of the outer peripheral end portion 11a.

The connector mounting portion 11A includes a cutout portion 11B and a connector mounting base 11b. The cutout portion 11B is formed so as to extend from the outer peripheral end portion 11a toward another end portion of the housing 11. The connector mounting base 11b is formed at a bottom portion of the cutout portion 11B and protrudes toward a radially outer side of the housing. On both side surfaces of the cutout portion 11B, inclined portions 11c which are inclined so as to extend from the outer peripheral end portion 11a of the housing toward the connector mounting base 11b of the housing are formed. The inclined portions 11c may be perpendicular to the outer peripheral end portion 11a. On an outer peripheral end portion of the connector mounting base 11b, a connector mounting base end portion 11d connected to the inclined portions 11c is formed so as to extend along a peripheral edge portion of the connector mounting base 11b.

In the connector 14, one surface among four surfaces which form an outer periphery of the connector 14 is disposed on the connector mounting base 11b. Among the remaining surfaces which form the outer periphery of the connector 14, two surfaces facing each other are disposed at positions adjacent to the inclined portions 11c, respectively. A part of the connector 14 disposed on the connector mounting portion 11A protrudes to the outside of the housing 11 from the cutout portion 11B. A portion between the one surface which forms the outer periphery of the connector 14 and the connector mounting base end portion 11d and a portion between each of the inclined portions 11c and a corresponding one of the two surfaces which form the outer periphery of the connector 14 and face each other are sealed by the second sealing material 31.

Among the four surfaces which form the outer periphery of the connector 14, the remaining one surface, which is other than the surface facing the connector mounting base 11b and the two surfaces adjacent to the two inclined portions 11c, faces an opening-side outer peripheral end portion of the case 25. This remaining one surface is sealed by the first sealing material 30a that seals a portion between the outer peripheral end portion 11a of the housing 11 and the opening-side outer peripheral end portion of the case 25.

As described above, according to the electric power steering device of the first embodiment, the connector 14 is disposed between the housing 11 of the control device 1 and the case 25 of the motor 2. Among the four surfaces which form the outer periphery of the connector 14, the portion between the housing 11 and each of the three surfaces facing the housing 11 is sealed by the second sealing material 31. Moreover, among the four surfaces which form the outer periphery of the connector 14, the portion between the remaining one surface and the outer peripheral end portion of the case 25 is sealed by the first sealing material 30a that seals the outer peripheral end portion 11a of the housing 11 and the outer peripheral end portion of the case 25. In a region in which the first sealing material 30a and the second sealing material 31 intersect each other, the first sealing material 30a and the second sealing material 31 adhere to each other.

In this way, the sealed regions between the housing 11 of the control device 1, the case 25 of the motor 2, and the connector 14 can be reduced. Therefore, the sealing process can be simplified, and the man-hours for manufacture can be reduced. It is not always required that the first sealing material 30a and the second sealing material 31 be made of the same material, and any materials that have excellent affinity may be adopted.

Moreover, in the electric power steering device according to the first embodiment, the cutout portion 11B is formed in the housing 11, which enables the connector 14 to be disposed on the connector mounting base 11b from the opening side of the housing 11.

In this way, at the time of disposing the connector 14 in the housing 11, the connector 14 and the control device main body 12 can be disposed in the housing 11 without applying a load to the control device main body 12 to which the plurality of terminals of the connector 14 are connected. Moreover, the connector 14 and the control device main body 12 can be disposed in the housing 11 from one direction. Therefore, the manufacturing process can be simplified.

Next, a procedure of sealing the portion between the housing 11 of the control device 1, the case 25 of the motor 2, and the connector 14 is described.

First, the second sealing material 31 in a form of paste is applied to the connector mounting base end portion 11d and the two inclined portions 11c, which form the connector mounting portion 11A of the housing 11.

Next, the control device main body 12 is disposed inside the housing 11, and the connector 14 is disposed on the connector mounting portion 11A of the housing 11. Thus, the second sealing material 31 is disposed at the portion between the housing 11 and each of the three surfaces among the four surfaces which form the outer periphery of the connector 14.

Next, the first sealing material 30a is applied to the opening-side outer peripheral end portion of the case 25.

Next, the outer peripheral end portion 11a of the housing 11 and the opening-side outer peripheral end portion of the case 25 are brought into abutment against each other.

In this way, the first sealing material 30a is disposed at the portion between the remaining one surface of the connector 14 and the outer peripheral end portion of the case 25.

Then, the first sealing material 30a and the second sealing material 31 are cured. Thus, the portions between the housing 11 of the control device 1, the case 25 of the motor 2, and the outer periphery of the connector 14 are sealed.

Further, in the first embodiment, the first sealing material 30a is applied to the opening-side outer peripheral end portion of the case 25 of the motor 2, to thereby seal the portion between the housing 11 and the case 25. However, a method for sealing the portion between the housing 11 and the case 25 is not limited to this.

For example, the second sealing material 31 is applied to the outer peripheral end portion 11a of the housing 11, the connector mounting base 11b which forms the connector mounting portion 11A, and the two inclined portions 11c. Then, after the connector 14 is disposed on the connector mounting portion 11A, the second sealing material 31 is further applied to an upper surface of the connector 14. Then, the opening-side outer peripheral end portion of the case 25 and the outer peripheral end portion 11a of the housing 11 are brought into abutment against each other, to thereby seal the portions between the housing 11, the case 25 and the connector 14. In this case, the second sealing material 31 can be applied to the outer peripheral end portion 11a of the housing 11, the inclined portions 11c, and the connector mounting base end portion 11d continuously from the same direction. Thus, the process can be further simplified. Further, the sealing material to be applied may be the first sealing material 30a.

Second Embodiment

Figure 3A:
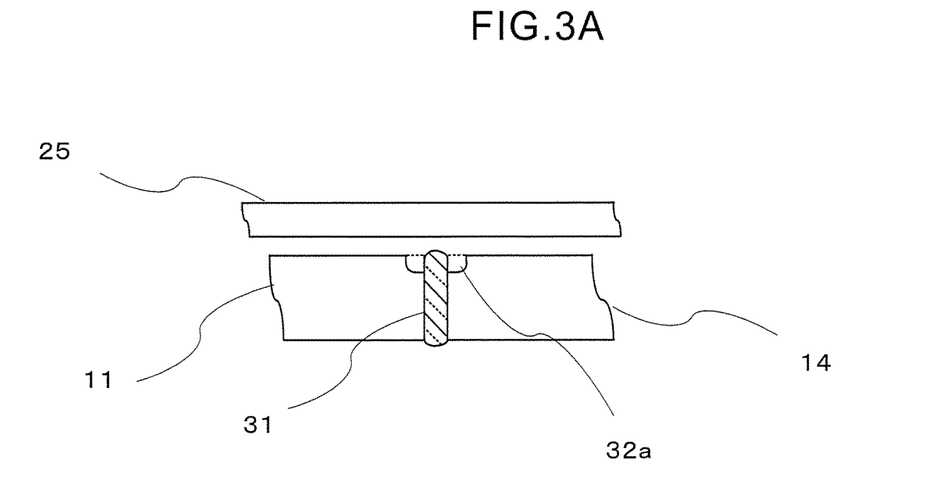
FIG. 3A is a schematic view of a seal structure in a second embodiment.
Figure 3B:
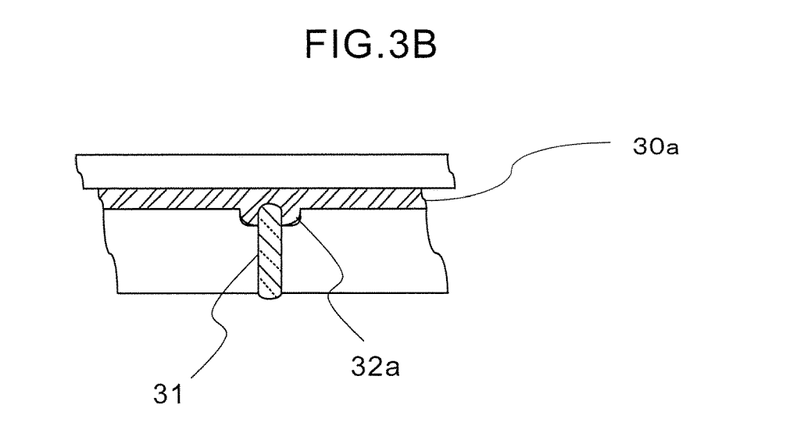
FIG. 3B is a schematic view of the seal structure in the second embodiment.
Figure 3C:
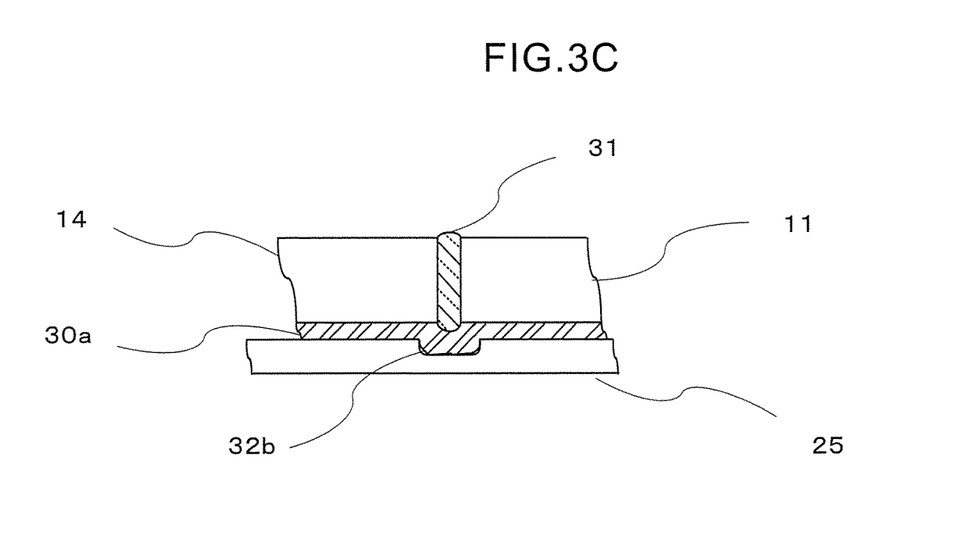
FIG. 3C is a schematic view of the seal structure in the second embodiment.

FIG. 3A to FIG. 3C are schematic views for illustrating a sealing portion of a housing 11, a connector 14, and a case 25 of a motor 2 in an electric power steering device according to a second embodiment. The electric power steering device according to the second embodiment is different from the electric power steering device according to the first embodiment in that a space for housing a surplus sealing material is formed in a periphery of a region in which a region to which the first sealing material 30a is applied and a region to which the second sealing material 31 is applied intersect each other. Other configurations are similar to those of the first embodiment.

FIG. 3A is an illustration of a state in which the housing 11 and the connector 14 are sealed by the second sealing material 31. As illustrated in FIG. 3A, the second sealing material 31 sticks out from the sealing portion of the housing 11 and the connector 14. In general, in the case of sealing a portion between two components, a sealing material having an amount slightly larger than necessary is disposed and caused to stick out so that a gap is not formed between the two components. In the electric power steering device according to the second embodiment, a space 32a for housing this surplus second sealing material 31 that sticks out is formed in both of the housing 11 and the connector 14.

FIG. 3B is an illustration of a state in which, after the housing 11 and the connector 14 are sealed, the first sealing material 30a is disposed on the case 25 of the motor 2, and the portion between the housing 11, the connector 14, and the case 25 is sealed. As illustrated in FIG. 3B, the first sealing material 30a disposed on the case 25 of the motor 2 is also disposed in a space 32a formed in the housing 11 and the connector 14. Then, the first sealing material 30a and the second sealing material 31 adhere to each other in the space 32a.

As described above, in the electric power steering device according to the second embodiment, the space 32a is formed in the housing 11 and the connector 14 in the region in which the second sealing material 31 disposed between the housing 11 and the connector 14 and the first sealing material 30a disposed on the case 25 intersect each other. The surplus first sealing material 30a and the surplus second sealing material 31 are housed in the space 32a. In this way, the first sealing material 30a and the second sealing material 31 adhere to each other in the space 32a, and a gap is prevented from being formed in the sealing portion. Moreover, the first sealing material 30a and the second sealing material 31 are prevented from sticking out from the housing 11, the connector 14, and the case 25. Hence, a joint of the sealing portion can be reliably sealed, and in addition, a step of removing the first sealing material 30a and the second sealing material 31, which sticks out, is reduced. Thus, the sealing process can be simplified.

Further, the space 32a is formed in both of the housing 11 and the connector 14 in FIG. 3A and FIG. 3B. However, the space 32a may be formed in only one of the housing 11 and the connector 14. Moreover, the case 25 of the motor 2 is brought into abutment against the housing 11 from above in FIG. 3A and FIG. 3B. However, the case 25 of the motor 2 may be located below, and the housing 11 may be brought into abutment against the case 25 of the motor 2 from above as illustrated in FIG. 3C. In this case, the space 32b is formed in the case 25 of the motor 2. As described above, when the space 32a or the space 32b is formed in the component located below in the sealing process, the surplus sealing material is likely to be received.

Third Embodiment

Figure 4A:
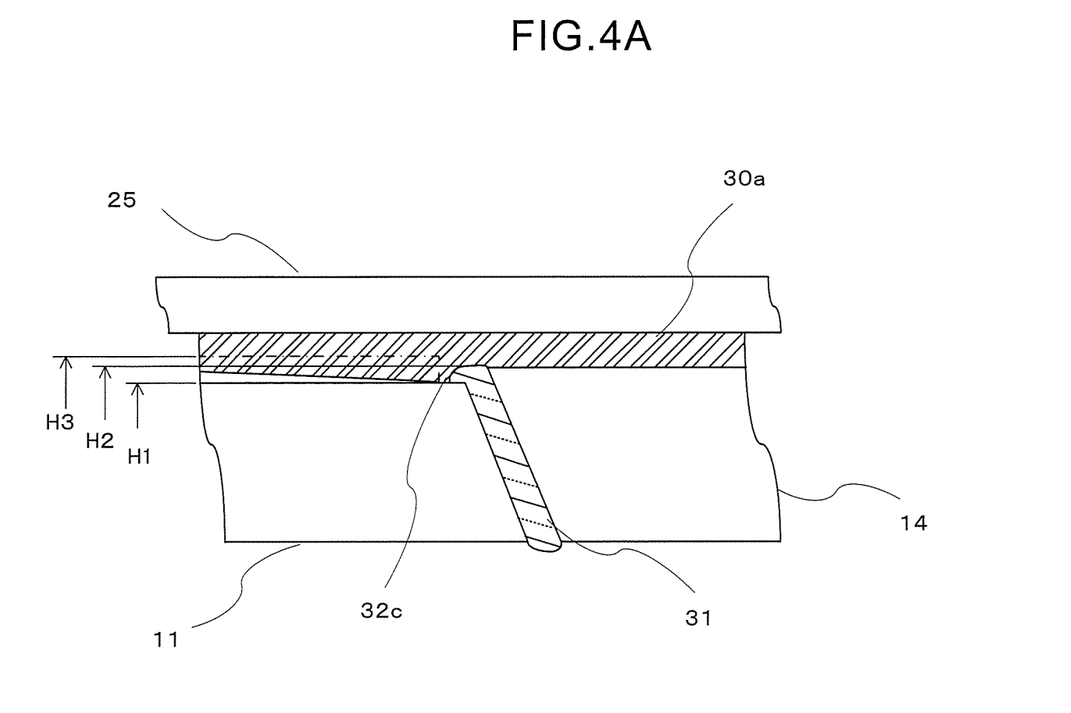
FIG. 4A is a schematic view of a seal structure in the second embodiment.
Figure 4B:
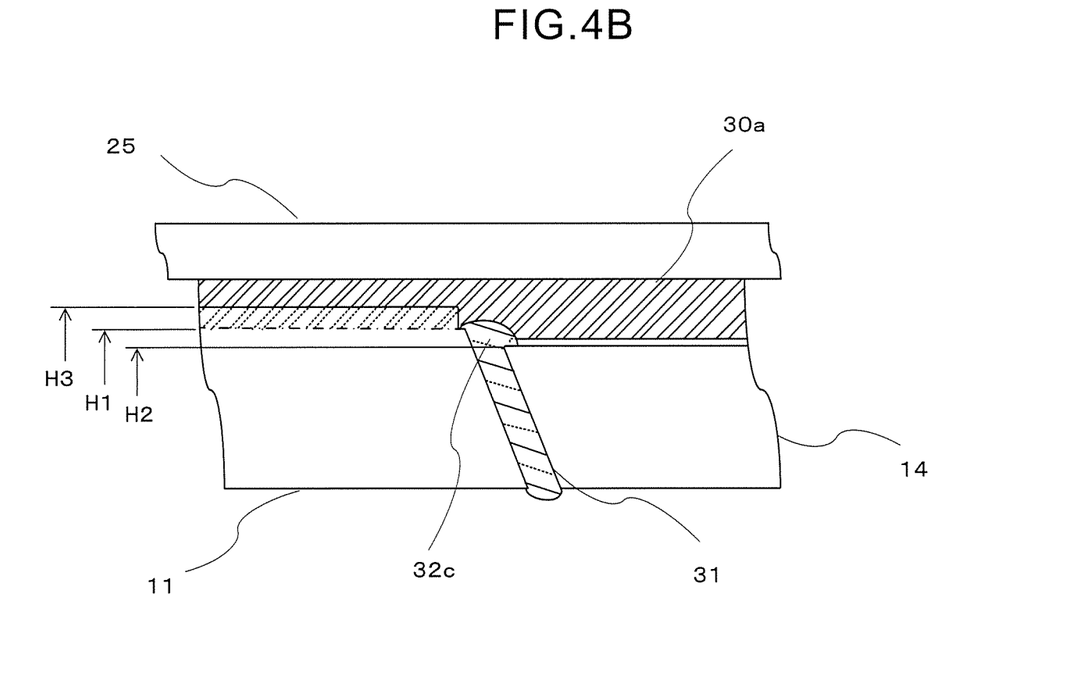
FIG. 4B is a schematic view of the seal structure in the second embodiment.

FIG. 4A and FIG. 4B are views for illustrating an electric power steering device according to a third embodiment. The electric power steering device according to the third embodiment is different from the electric power steering device according to the second embodiment in that a height of an upper surface of the housing 11 and a height of an upper surface of the connector 14 are different from each other. Other configurations are similar to those of the first embodiment.

As illustrated in FIG. 4A, in a region in which the housing 11 and the connector 14 are sealed, the height of the upper surface of the housing 11 is a lowest height H1, which is lower than a height of an upper surface H2 of the connector 14. Moreover, the upper surface of the housing 11 is higher as separating away from the sealing portion of the housing 11 and the connector 14, and the height thereof at a position most distant from the region in which the housing 11 and the connector 14 are sealed is H3 higher than the upper surface H2 of the connector 14. In this way, a space 32c is formed in the upper surface of the housing 11 in the region in which the housing 11 and the connector 14 are sealed. With the presence of this space 32c, the second sealing material 31 that sticks out from an end portion between the housing 11 and the connector 14 is housed in the space 32c.

In a sealing process for the electric power steering device according to the third embodiment, first, the housing 11 and the connector 14 are sealed by the second sealing material 31 as illustrated in FIG. 4A. After that, the first sealing material 30a is applied to upper portions of the housing 11 and the connector 14, and a case 25 of a motor 2 is brought into abutment against each other from above.

At this time, an amount of the first sealing material 30a is adjusted so as to be larger in the vicinity of the space 32c. This adjustment can be performed by controlling a discharge rate of the first sealing material 30a discharged from a sealing device or by controlling a moving speed of the sealing device. The adjustment of an application amount of the first sealing material 30a is performed more easily by controlling the moving speed of the sealing device. That is, the sealing device is moved at low speed on an upper portion of the space 32c to increase the application amount of the first sealing material 30a, and the sealing device is moved at middle speed on the upper portion of the connector 14. The sealing device is moved while being accelerated on the upper portion of the housing 11 so that the application amount of the first sealing material 30a can be reduced as the height of the housing 11 becomes higher.

FIG. 4B is a modification example of the third embodiment. In the modification example of FIG. 4B, a groove for holding the first sealing material 30a is formed in an outer peripheral end portion 11a of the housing 11. A height H1 of a bottom portion of the groove is higher than a height H2 of the upper portion of the connector 14. Therefore, a space 32C is formed between the bottom portion of the groove of the housing 11 and the upper portion of the connector 14. Through formation of the housing 11 as described above, a surplus amount of the second sealing material 31 that seals the housing 11 and the connector 14 is caused to stick out to this space 32c.

In a sealing process in the modification example of the third embodiment, first, the housing 11 and the connector 14 are sealed by the second sealing material 31 as illustrated in FIG. 4B. After that, the first sealing material 30a is applied to upper portions of the housing 11 and the connector 14, and a case 25 of a motor 2 is brought into abutment against each other from above.

At this time, an application amount of the first sealing material 30a is adjusted so as to be larger in the vicinity of the space 32c. That is, the sealing device is moved on the upper portions of the space 32c and the connector 14 at low speed to increase the application amount of the first sealing material 30a, and the sealing device is moved at high speed on the upper portion of the housing 11 to reduce the application amount of the first sealing material 30a. Further, in the modification example illustrated in FIG. 4B, the groove for holding the first sealing material 30a is also formed in the upper surface of the connector 14.

As described above, in the electric power steering device according to the third embodiment, through formation of the space 32c with variation in heights of the upper surfaces of the housing 11 and the connector 14, the surplus first sealing material 30a and the surplus second sealing material 31 are caused to stick out to the space 32c. Further, the application amount of the first sealing material 30a is increased on the upper portion of the space 32c and the upper portion of the connector 14, and the application amount of the first sealing material 30a is reduced in the vicinity of the portion in which the height of the housing 11 is high.

In this way, sufficient amounts of the first sealing material 30a and the second sealing material 31 can be applied to the respective sealed regions. Moreover, the first sealing material 30a and the second sealing material 31 can adhere to each other in the space 32c. Thus, reliable sealing can be performed in the region in which the sealing portions intersect each other. Further, the first sealing material 30a and the second sealing material 31 can be prevented from sticking out to the outside of the housing 11, the connector 14, and the case 25. Thus, the step of removing the first sealing material 30a and the second sealing material 31, which stick out, is reduced, and the sealing process can be simplified.

REFERENCE SIGNS LIST 1 control device, 2 motor, 11 housing, 11a outer peripheral end portion, 11b connector mounting base, 11c inclined portion, 11d connector mounting base end portion, 11A connector mounting portion, 11B cutout portion, 12 control device main body, 14 connector, 21 output shaft, 22 stator, 23 rotor, 24 winding, 25 case, 30a first sealing material, 31 second sealing material, 32a, 32b space (recessed portion), 32c space

The invention claimed is:

1. An electric power steering device, comprising:
a motor; and
a control device,
wherein the motor includes a case having a cylindrical shape which is opened at one end portion,
wherein the control device includes:
a control device main body;
a connector connected to the control device main body; and
a housing having a cylindrical shape which is opened at one end portion and closed at another end portion,
wherein the housing houses the control device main body,
wherein the case and the housing are coupled to each other in a state in which an outer peripheral end portion at the one end portion of the case and an outer peripheral end portion at the one end portion of the housing face each other,
wherein a first sealing material is disposed between the outer peripheral end portion of the case and the outer peripheral end portion of the housing,
wherein the connector is disposed between the outer peripheral end portion of the case and the outer peripheral end portion of the housing,
wherein a second sealing material is disposed between the housing and at least one surface facing the housing among a plurality of surfaces which form an outer periphery of the connector, and wherein a part of the first sealing material disposed between the outer peripheral end portion of the case and the outer peripheral end portion of the housing and a part of the second sealing material disposed between the housing and the surface of the connector adhere to each other.

2. The electric power steering device according to claim 1,
wherein the housing includes a connector mounting portion, which is formed on the outer peripheral end portion of the housing, and is configured to receive the connector disposed thereon,
wherein the connector mounting portion includes:
   a cutout portion formed so as to extend from the outer peripheral end portion toward another end portion of the housing; and
   a connector mounting base, which is formed at a bottom portion of the cutout portion, and protrudes toward a radially outer side of the housing,
wherein the connector is disposed on the connector mounting base in a state in which a part of the connector protrudes to an outside of the housing from the cutout portion, and
wherein the second sealing material is disposed between the connector mounting base and the one surface among the plurality of surfaces which form the outer periphery of the connector, and between another two surfaces which form the outer periphery of the connector and both side surfaces of the cutout portion.

3. The electric power steering device according to claim 1, wherein a material of the first sealing material is different from a material of the second sealing material.

4. The electric power steering device according to claim 1,
wherein at least one of the outer peripheral end portion of the housing, the outer peripheral end portion of the case, and the outer periphery of the connector includes:
   a recessed portion which is open toward an intersecting region between a region in which, among the outer peripheral end portion of the housing, the outer peripheral end portion of the case, and the outer periphery of the connector, a set of any two is sealed, and a region in which another set of any two is sealed intersect each other.

5. The electric power steering device according to claim 4, wherein, in the intersecting region between the region in which the outer peripheral end portion of the housing and the outer periphery of the connector are sealed and the region in which the outer peripheral end portion of the housing and the outer peripheral end portion of the case are sealed, a distance between the outer peripheral end portion of the housing and the outer peripheral end portion of the case is larger than a distance between the outer periphery of the connector and the outer peripheral end portion of the case.

6. The electric power steering device according to claim 4,
wherein, in the intersecting region between the region in which the outer peripheral end portion of the housing and the outer periphery of the connector are sealed and the region in which the outer peripheral end portion of the housing and the outer peripheral end portion of the case are sealed,
a distance between the outer periphery of the connector and the outer peripheral end portion of the case is larger than a distance between the outer peripheral end portion of the housing and the outer peripheral end portion of the case.

7. The electric power steering device according to claim 2, wherein both side surfaces of the cutout portion include inclined portions which are inclined so as to extend from the outer peripheral end portion of the housing toward the connector mounting base.

* * * * *